(12) United States Patent
Wolfe

(10) Patent No.: US 11,392,705 B1
(45) Date of Patent: Jul. 19, 2022

(54) DISK ENCRYPTION KEY MANAGEMENT FOR BOOTING OF A DEVICE

(71) Applicant: Netskope, Inc., Santa Clara, CA (US)

(72) Inventor: Jason Lee Wolfe, Gilbert, AZ (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/389,053

(22) Filed: Jul. 29, 2021

(51) Int. Cl.
*G06F 21/57* (2013.01)
*G06F 9/4401* (2018.01)
*H04L 9/40* (2022.01)
*G06F 21/62* (2013.01)
*H04L 9/08* (2006.01)

(52) U.S. Cl.
CPC .......... *G06F 21/575* (2013.01); *G06F 9/4401* (2013.01); *G06F 21/62* (2013.01); *H04L 9/0877* (2013.01); *H04L 9/0897* (2013.01); *H04L 63/126* (2013.01); *G06F 2221/034* (2013.01)

(58) Field of Classification Search
CPC ...... G06F 21/575; G06F 9/4401; G06F 21/62; G06F 2221/034; H04L 9/0877; H04L 9/0897; H04L 63/126
See application file for complete search history.

(56) References Cited

U.S. PATENT DOCUMENTS

| | | | |
|---|---|---|---|
| 7,313,679 B2 | 12/2007 | Ranganathan | |
| 7,752,428 B2 | 7/2010 | Datta | |
| 7,984,286 B2 | 7/2011 | Zimmer | |
| 8,176,336 B1 * | 5/2012 | Mao | G06F 21/57 713/189 |
| 8,462,955 B2 | 6/2013 | Ureche | |
| 8,738,932 B2 | 5/2014 | Lee | |
| 8,892,858 B2 | 11/2014 | Smith | |
| 9,154,299 B2 * | 10/2015 | Beachem | H04L 9/0894 |

(Continued)

FOREIGN PATENT DOCUMENTS

| | | |
|---|---|---|
| CN | 101038556 B | 5/2010 |
| CN | 101576944 B | 9/2011 |

(Continued)

OTHER PUBLICATIONS

Lebedev et al., "Secure Boot and Remote Attestation in the Sanctum Processor", 2018, IEEE 31st Computer Security Foundations Symposium, p. 46-60.*

*Primary Examiner* — Christopher A Revak
(74) *Attorney, Agent, or Firm* — Kilpatrick Townsend & Stockton, LLP

(57) ABSTRACT

A key management system for providing encryption of a disk in a client device is provided. The system comprises a trusted platform module (TPM) having a first fragment of a key, a remote storage having a second fragment of the key, and a processing unit to partially boot instructions relating to the booting of the client device, send a request for validation of the instructions to the TPM, receive the first fragment of a key from the TPM if the validation is successful, send a request for the second fragment of the key along with credentials to access the remote storage. The remote storage verifies the credentials and a network through which the request is received and transmits the second fragment if the verification is successful. The processing unit then combines the first fragment and second fragment of the key to generate an encryption key which is used to complete the booting.

17 Claims, 11 Drawing Sheets

(56) References Cited

U.S. PATENT DOCUMENTS

| | | |
|---|---|---|
| 9,218,490 B2 | 12/2015 | Wiseman |
| 9,230,109 B2 | 1/2016 | Wooten |
| 9,342,711 B2 | 5/2016 | Wang |
| 9,928,377 B2 | 3/2018 | Narayanaswamy |
| 9,996,698 B2 | 6/2018 | Breuer |
| 10,855,674 B1 | 12/2020 | Geusz |
| 2009/0328195 A1 | 12/2009 | Smith |
| 2010/0303230 A1* | 12/2010 | Taveau .................. G06F 21/35 380/30 |
| 2010/0313011 A1 | 12/2010 | Laffey |
| 2015/0288514 A1* | 10/2015 | Pahl ...................... H04L 63/166 713/171 |
| 2016/0070932 A1* | 3/2016 | Zimmer ................ G06F 21/53 713/192 |
| 2016/0283937 A1* | 9/2016 | Reese ................ G06Q 20/4012 |
| 2018/0144146 A1* | 5/2018 | Juriasingani .......... H04L 9/0894 |
| 2019/0045358 A1* | 2/2019 | Ahmed ................ H04W 12/06 |
| 2020/0065496 A1* | 2/2020 | Smith .................... G06F 21/88 |
| 2020/0175170 A1* | 6/2020 | Diamant .............. H04L 9/0643 |
| 2021/0216476 A1* | 7/2021 | Sawan .................... H04L 9/14 |

FOREIGN PATENT DOCUMENTS

| | | |
|---|---|---|
| EP | 3479283 B1 | 9/2020 |
| JP | 2019016370 A | 4/2019 |
| JP | 2019153330 A | 9/2019 |
| WO | WO2015143989 A1 | 10/2015 |

\* cited by examiner

DISK ENCRYPTION KEY MANAGEMENT FOR BOOTING OF A DEVICE

BACKGROUND

This disclosure relates in general to information security and, but not by way of limitation, to non-volatile computer storage security.

In today's technologically driven world, the security of data is imperative. In the past, a Trusted Platform Module (TPM) was used at large. The TPM is responsible for protecting the data by not permitting attackers to download and install malicious software on a device of user. It is common to have disk encryption keys stored in a local chip, for example, TPM on the device. Disk encryption keys intend that the device can boot software that matches with stored signatures that are programmed in the TPM. This works well for ensuring malicious software doesn't boot, then it's not secure. If an attacker steals the hardware, for example, TPM or motherboard, they still have full access to the data stored in the computer as the TPM is part of the motherboard. They can then defeat the approved software security also, without a time constraint.

SUMMARY

A key management system for providing encryption of a disk in a client device is provided. The system comprises a trusted platform module (TPM) having a first fragment of a key, a remote storage having a second fragment of the key, and a processing unit to partially boot instructions relating to booting of client device, send a request for validation of the instructions to the TPM, receive the first fragment of a key from the TPM if the validation is successful, send a request for the second fragment of the key along with credentials to access the remote storage. The remote storage verifies the credentials and a network through which the request is received and transmits the second fragment if the verification is successful. The processing unit then combines the first fragment and second fragment of the key to generate an encryption key which is used to complete the booting.

In one embodiment, a system for providing encryption of a disk in a client device is disclosed. The system comprises a Trusted Platform Module (TPM) having a first fragment of a key, a remote storage having a second fragment of the key and a processing unit. The processing unit configured to partially boot the plurality of instructions from the non-volatile memory, send a request for validation of the plurality of instructions to the TPM, receive the first fragment of a key from the TPM in response to the validation of the plurality of instructions, send a request for the second fragment of the key to the remote storage along with credentials used to access the remote storage. The credentials are used to access the remote storage. The remote storage is configured to verify the network, verification of the network includes determining if the network meets at least one predefined criteria, receive the second fragment of the key if the credentials are verified by the remote storage and the network meets the at least one predefined criteria, combine the first fragment of the key and the second fragment of the key to generate an encryption key. The encryption key is used to complete the booting of the plurality of instructions from the disk using the encryption key and access the data stored on the client device in response to the completion of the booting of the plurality of instructions from the disk.

In another embodiment, a method is provided for encryption of a disk in a client device. In one step, partially boot a plurality of instructions from a non-volatile memory. A request for validation of the plurality of instructions is sent to a Trusted Platform Module (TPM) and a first fragment of a key from the TPM is received in response to the validation of the plurality of instructions. A request for a second fragment of the key is sent to a remote storage along with credentials used to access the remote storage. The remote storage verifies a network, verification of the network includes determining if the network meets at least one predefined criteria. If the credentials are determined to be valid by the remote storage and if the network meets the predetermined criteria, the second fragment of the key is received from the remote storage. Once the second fragment of the key is received, the first fragment of the key and the second fragment of the key are combined to generate an encryption key. The encryption key is used to complete the booting of the plurality of instructions from the disk using the encryption key and access the data stored on the client device in response to the completion of the booting of the plurality of instructions from the disk.

In yet another embodiment, key management system including client device and remote storage for providing encryption of a disk in a client device. The key management system comprising a client device, remote storage and a processing unit, collectively having code for:

partially booting a plurality of instructions from a non-volatile memory;

sending a request for validation of the plurality of instructions to a Trusted Platform Module (TPM);

receiving a first fragment of a key from the TPM in response to the validation of the plurality of instructions;

sending a request for a second fragment of the key to a remote storage along with credentials used to access the remote storage, wherein the credentials are used to access the remote storage, the remote storage is configured to verify a network, verification of the network includes determining if the network meets at least one predefined criteria;

receiving the second fragment of the key if the credentials are verified by the remote storage and the network meets the at least one predefined criteria;

combining the first fragment of the key and the second fragment of the key to generate an encryption key;

completing the booting of the plurality of instructions from a disk using the encryption key; and accessing the data stored on the client device in response to the completion of the booting of the plurality of instructions from the disk.

Further areas of applicability of the present disclosure will become apparent from the detailed description provided hereinafter. It should be understood that the detailed description and specific examples while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
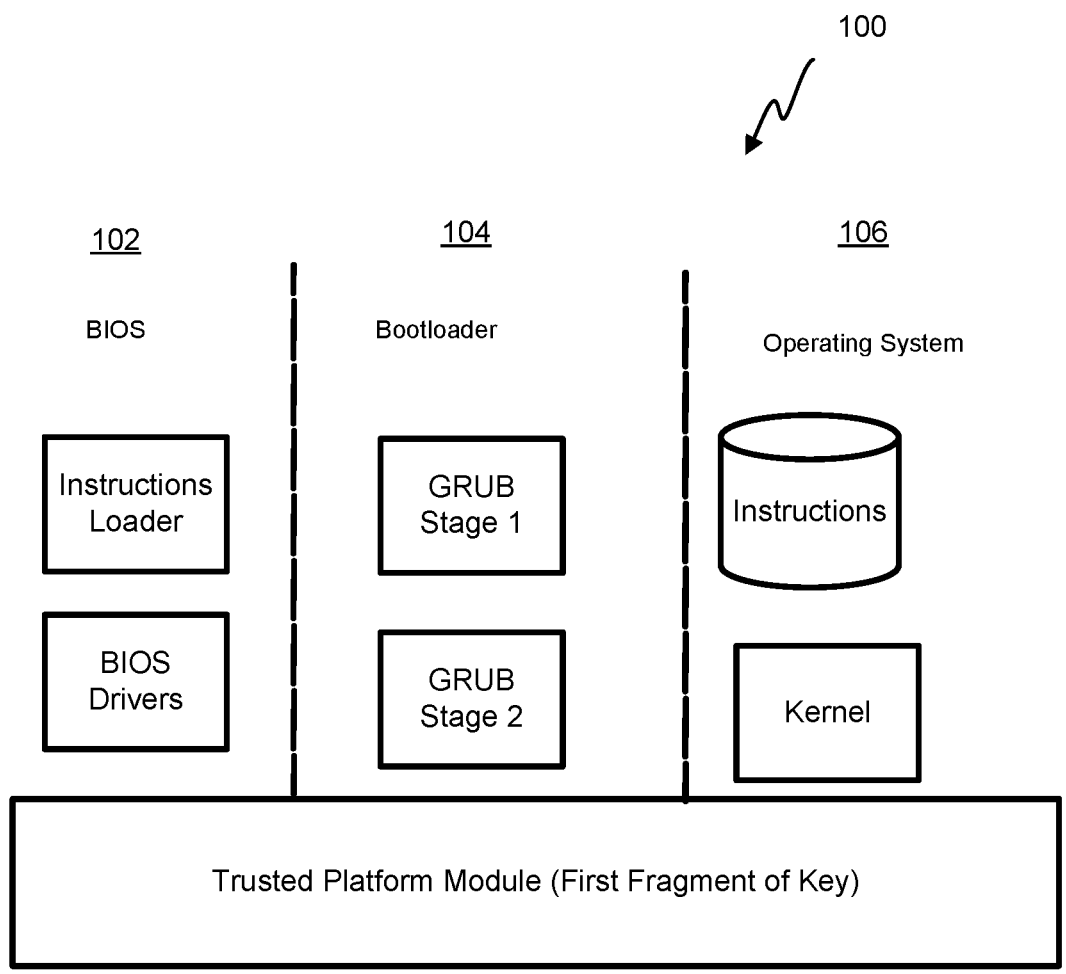
FIG. 1 illustrates an exemplary embodiment of various stages of booting in a computer, in accordance with one embodiment of the present disclosure.

Referring to FIG. 1, illustrates an exemplary embodiment describing various stages of booting in a device 100, according to some embodiment of the present disclosure. A first stage 102 is performed by a basic input/output system (BIOS), a second stage 104 is performed by a bootloader and a third stage 106 is performed by an operating system. The booting of the device 100 starts from an instant a power button present on the device 100 is pressed by a user operating the device 100. The power button provides a power supply to the device 100 and marks an indication to start the device 100.

The BIOS is a program that is pre-loaded in the device 100. When the device 100 is powered on, the BIOS processes initial programs present in the device 100. The initial programs are responsible for initializing the device 100. After the initialization, the BIOS loads a program called the bootloader from a storage device, such as a hard drive or Compact Disk (CD) and calls an entry function of the bootloader.

The bootloader is a program that loads the operating system into a memory and transfers control to it. When the bootloader loads the operating system, it can read memory layout information from the operating system program and load pre-stored instructions relating to the operating system in the memory. The memory can be a volatile memory or a non-volatile memory. The Bootloader comprises Grand Unified Bootloader (GRUB) stage 1 and stage 2. The GRUB stage 1, also called a primary boot loader and GRUB stage 2, also called a secondary boot loader defines different stages for loading the operating system by the bootloader. The GRUB stage 1 and GRUB stage 2 loads the operating system into memory and transfers control of the computer to the operating system. In addition to GRUB stage 1 and stage 2, there can be other bootloaders 104. For example, the bootloader 104 includes systemd-boot, LILO, TBoot.

The operating system is a system software that manages computer hardware, software resources, and provides common services for computer programs. The computer can include any operating system, for example, Windows®, Linux®, etc.

The various stages 102, 104, and 106 of the booting process are secured by a secure module called the TPM. The TPM provides security against installing malicious software on the computer. The TPM is a standard for a dedicated microchip designed to secure hardware through integrated cryptographic keys. Generally, the TPM is installed on a motherboard of a computer and communicates with the remainder of the system by using one or more hardware buses.

Figure 2A:
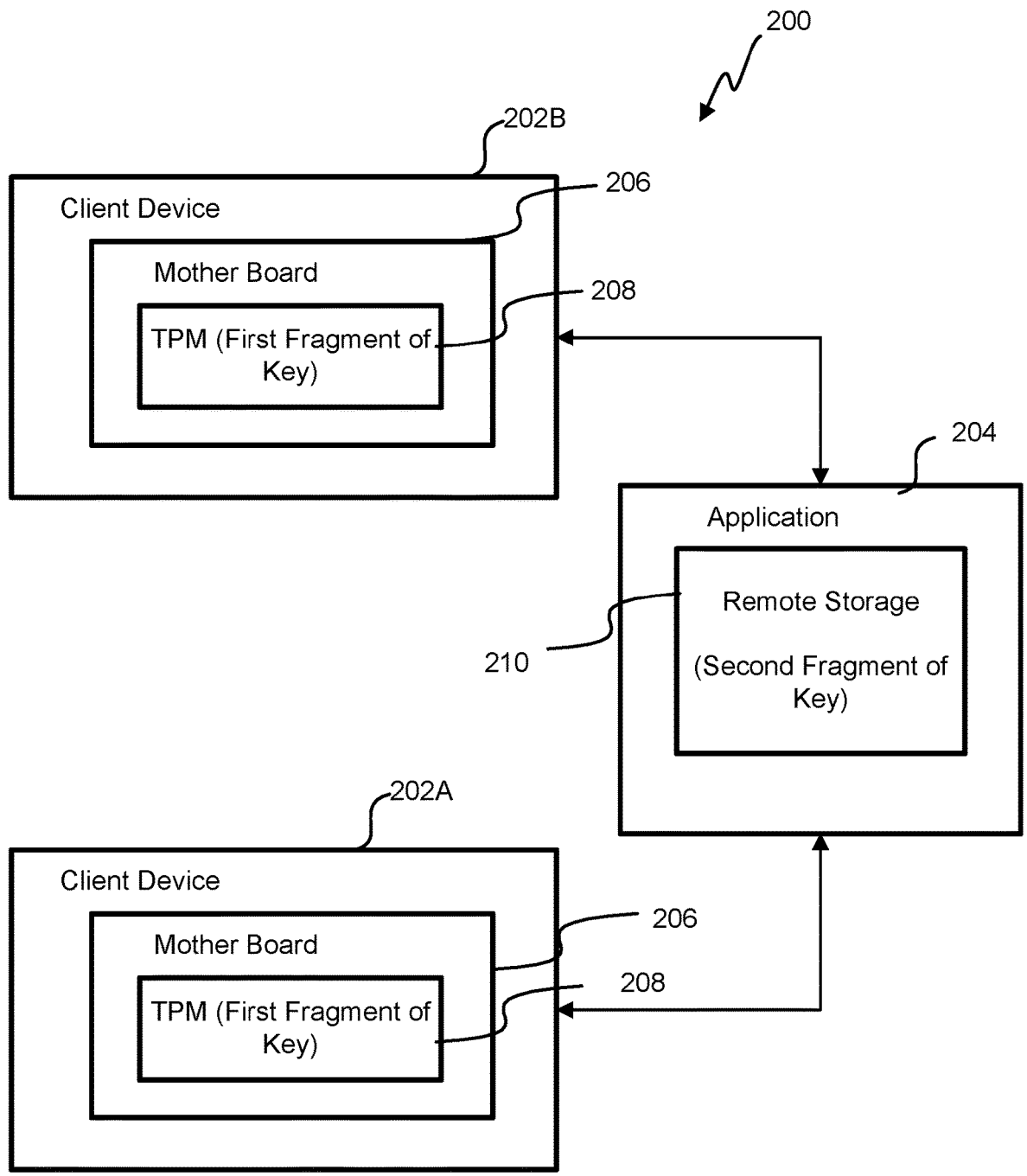
FIG. 2A illustrates an exemplary embodiment of a key management system, in accordance with one embodiment of the present disclosure.

FIG. 2A illustrates a key management system 200 for providing an encryption of a disk in the device 100, according to some embodiment of the present disclosure. System 200 comprises a plurality of client devices 202A and 202B, collectively called client device 202, connected with a remote storage 210. Although two client devices 202 A and 202B have been shown, there can be any number of client devices present in the system 200. The connection between the client devices 202A and 202B and the remote storage 210 can be either via a bus or via a network. The client devices 202A and 202B can be a computer, a laptop, a smartphone, any other computing device.

The client devices 202A and 202B include a motherboard 206. The motherboard 206 permits communication between various components of the client devices 202A and 202B. For example, the motherboard 206 permits interaction between components like a central processing unit (CPU), Graphic processing unit (GPU), hard disk, etc. present inside the client device 202 (202A and 202B). Further, the TPM 208 is present inside the motherboard 206. The TPM 208 is used in disk encryption utilities, and protects keys used to encrypt the client device's storage devices and provide integrity authentication for a trusted booting of the client device 202 (202A and 202B). The TPM 208 comprises a first fragment of a key.

The remote storage 210 can be present in an application 204 running in the client device 202. In one embodiment, the remote storage 210 cannot be present on the client device 202 and can be accessed using a network. The remote storage 210 comprises a second fragment of the key.

Figure 2B:
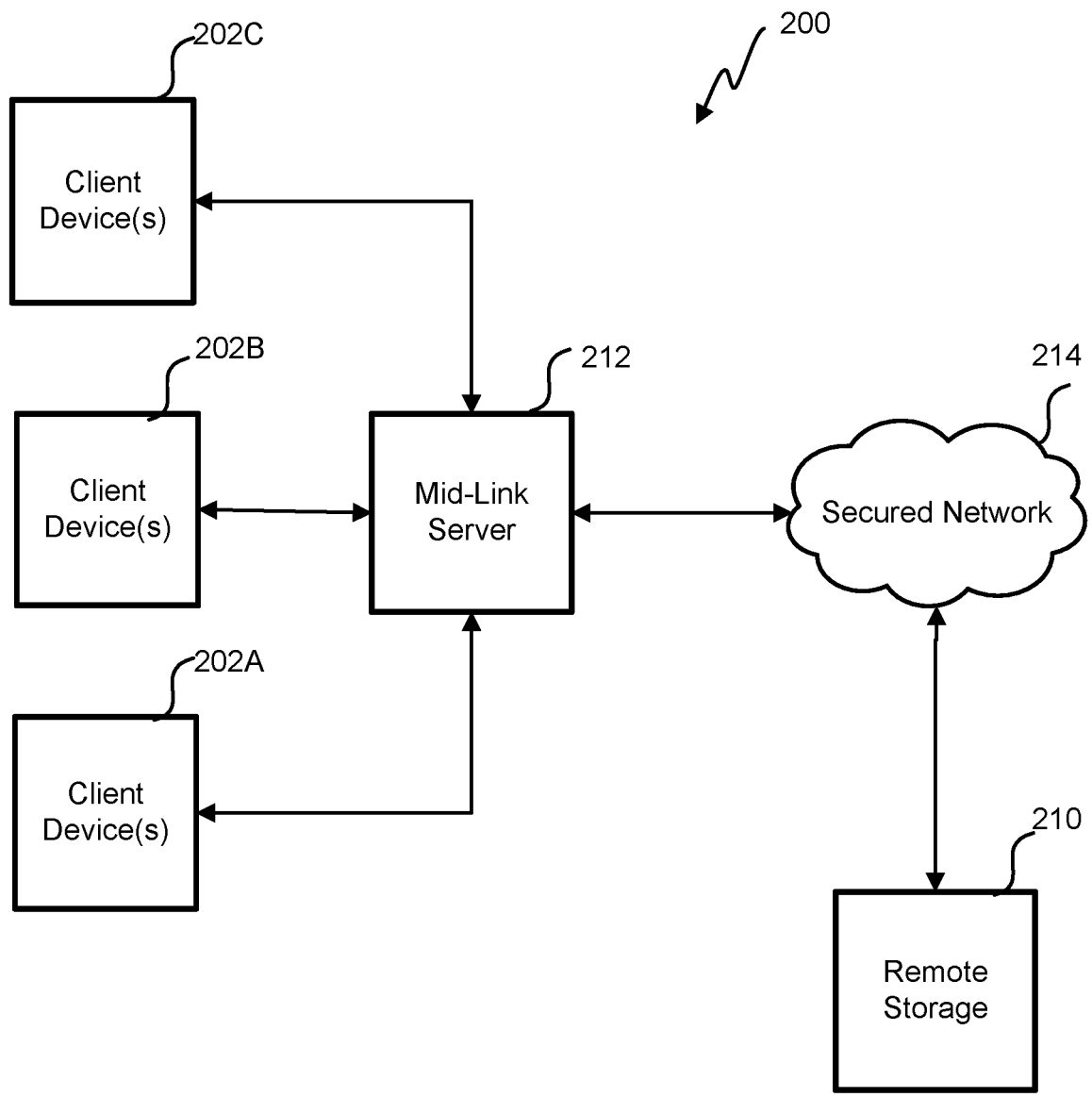
FIG. 2B illustrates another exemplary embodiment of the key management system, in accordance with another embodiment of the present disclosure.

FIG. 2B is another embodiment of system 200 for providing encryption of a disk in the client device 202, according to some embodiment of the present disclosure. The remote storage 210 is not present on the client device 202 and is accessed using a mid-link server 212 and a secured network 214. Thus, the client device 202 communicates with the remote storage 210 via the mid-link server 212 and the secured network 214. The communication of the client device 202 with the remote storage 210 occurs for the second fragment of the key which is stored in the remote storage 210. The mid-link server 212 for the work systems resides as a "man-in-the-middle" intentionally take over some or every: processing, application execution, and/or content sites at a web server and the services interaction. The remote software environment is hosted by the mid-link server 212 for a policy-controlled experience for authorization and control.

The secured network 214 is a network that meets a set of predefined criteria. The predetermined criteria include for example, having a secured Internet Protocol (IP) address of the network The secured network 214 is already known to the client device 202 and the remote storage 210. The secured network 214 is a network that has previously been used by the user to access the remote storage 210. In one embodiment, the secured network 214 is pre-registered by the user for accessing the remote storage 210. When the client device 202 (202A and 202B) sends a request to the remote storage 210 for the second fragment of the key along with the credentials, the remote storage 210 also checks if the network through which the request has been received from the client device 202 (202A and 202B) is the secured network 214. If the request is not received through the secured network 214, the remote storage 210 denies the request for the second fragment of the key.

Figure 3A:
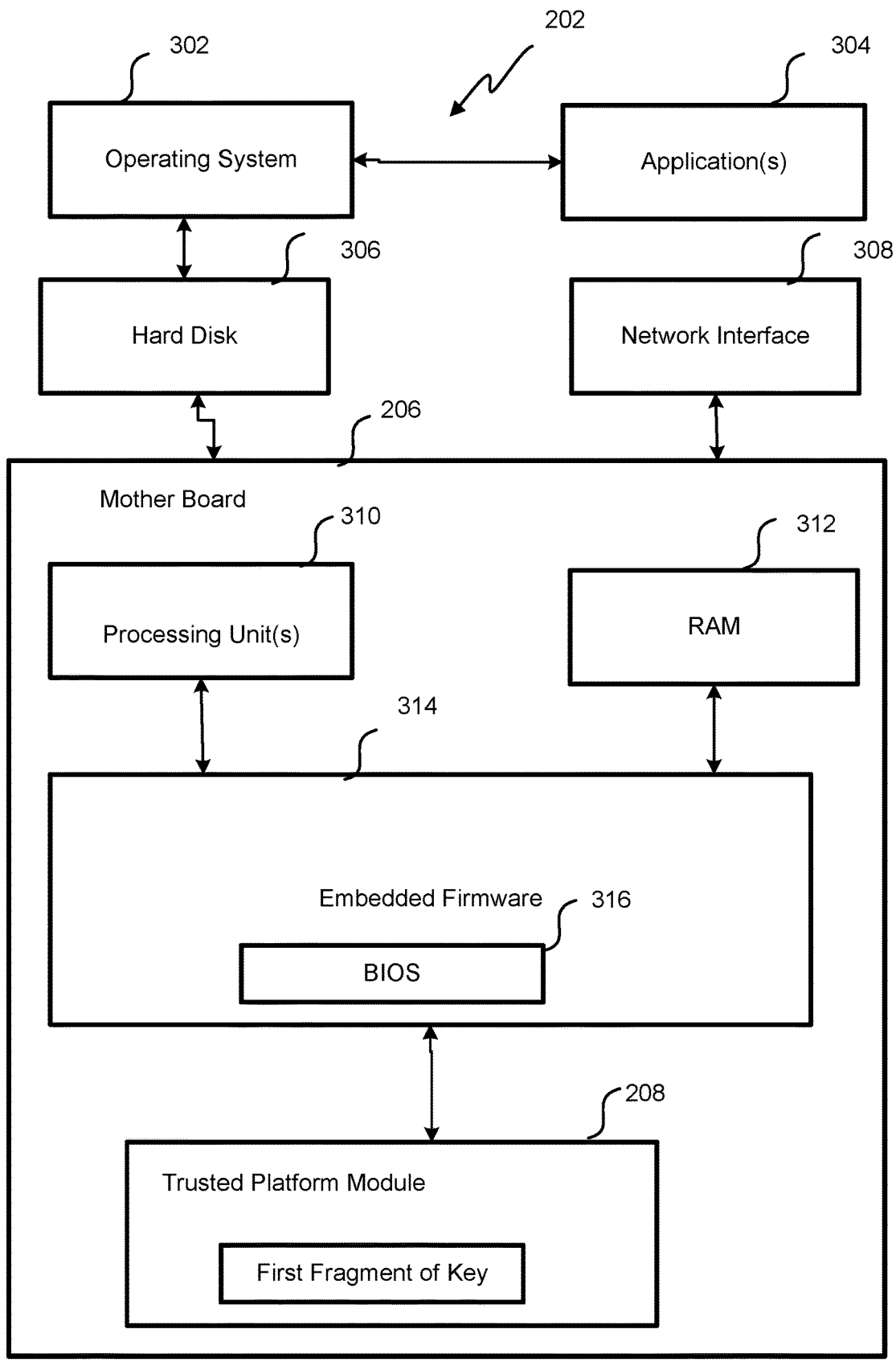
FIG. 3A illustrates a client device, in accordance with one embodiment of the present disclosure.

FIG. 3A shows the client device 202 (202A and 202B), according to some embodiment of the present disclosure. The client device 202 comprises an operating system 302, application 204, a hard disk 306, a network interface 308, a motherboard 206 including a processing unit 310, a Random-access memory (RAM) 312, an embedded firmware 314 including a BIOS 316, a Trusted Platform Module (TPM) 208.

The client device(s) 202 runs an operating system (OS) 302 such as Windows™ iOS™, Android™, Linux, set-top box OSes such as Real-Time Operating System (RTOS), Unix OS, Linux-Kernel, and Linux OS in the Internet of Things (IoT)/Industrial control systems (ICS)/Distributed Control Systems (DCS)/Operational Technology (OT), and Chromebook™.

The client device 202 (202A and 202B) can run various application(s) 204. The application(s) 204 can relate to the booting process or can be third-party applications that can be installed by users of the client device 202. The applications 304 relating to booting processes can form an internal part of the client device 202 and cannot be removed/uninstalled by the users of the computer. The application(s) 204 also includes the remote storage 210. The application(s) 204 running the remote storage can be, for example, include a vault or form part of secret storage in the client device 202.

The hard disk 306 includes a hardware component that stores the digital content. The operating system, software titles, and other files are also stored in the hard disk 306. When the client device 202 boots up, the operating system 302 and other files and instructions relating to the booting process are loaded from the hard disk 306.

The motherboard 206 includes an embedded firmware 314 which further includes BIOS 316. The firmware 314 comprises various electronic components with embedded software instructions, such as the BIOS. During the booting process, firmware 314 defines how the client device 202 should turn on, and from which drive (in case of multiple hard disks) the client device 202 should boot. The firmware 314 controls the client device 202 until the operating system takes over the operation of the client device 202. The function of firmware 314 can also include initializing other hardware components present in the client device involved in booting of the client device 202. The firmware 314 is non-volatile and remain in memory even after the client device 202 is turned off.

When the client device 202 boots up, the processing unit 310 partially boots a plurality of instructions related to booting stored in the RAM 312. Since it is easier and faster to boot the instructions from RAM 312 rather than the hard disk 306, the instructions are stored in RAM 312. The instructions include a generic kernel and a boot directory. The boot directory include RAM disk and kernel modules. These instructions partially boot the client device 202 and request a portion of a first fragment of an encryption key from the TPM 208.

In particular, upon partially booting the client device 202, the processing unit 310 sends a request for validation of the plurality of instructions to the TPM 208. If the plurality of instructions is valid, the TPM 208 validates the plurality of instructions and transmits the first fragment of the key to the processing unit 310. The validation of the plurality of instructions includes validating the stored signature of the kernel/other booting files, for example, boot directory. Validation of the stored signatures can partially load the instructions and partially boot the client device 202.

Upon partially booting the client device 202, the processing unit 310 sends a request for a second fragment of the key to the remote storage 210 along with a set of credentials for accessing the remote storage 210. The credentials for accessing the remote storage 210 can be saved on TPM 208. The presence of the second fragment of the key at the remote storage 210 provides an advantage when the hardware for example, motherboard or TPM is stolen from the client device 202. The credentials to access the remote storage 210 can include a username and a password. The username and password can be pre-defined by a user or a manufacturer of the TPM. In an embodiment, the credentials can be defined based on one or more pre-defined policies. In another embodiment, the policies can include machine-specific credentials.

If the credentials are valid, the remote storage 210 sends the second fragment of the key to the processing unit 310. The processing unit 310, upon receiving the second fragment of the key combines the second fragment of the key with the first fragment of the key to generate an encryption key. The processing unit 310 can combine the first fragment of the key and the second fragment of the key using one or predefined policies. The policies can include, for example, applying Exclusive OR (XOR) function. However, there can be other policies also.

The encryption key can then be used to complete the booting of the plurality of instructions. The complete booting of the client device 202 provides access to the complete data stored on the computer. If the credentials are not verified and the second fragment of the key is not received by the processing unit, the booting process fails.

In one embodiment, the processing unit 310 after receiving the first fragment of the key and the second fragment of the key stores them in RAM 312. Both the first fragment of the key and the second fragment of the key are discarded after generating the encryption key. In one embodiment, the generated encryption key is also discarded once the booting process is complete.

In one embodiment, the first fragment of the key and the second fragment of the key are rotatable. For example, in case of authorized access by a fraudulent user for stealing the sensitive data present inside the client device 202, the processing unit 310 rotates the first fragment of the key and the second fragment of the key. Other events for rotating the first fragment of the key and the second fragment of the key include detecting malware attack in the client device 202, detection of leakage of any of the keys, etc. After updating the first fragment of the key and the second fragment of the key, the first fragment of the key is updated in the TPM 208.

The presence of the second fragment of the key at the remote storage 210 provides an advantage that if the TPM is taken off the client device 202, a fraudulent user is unable to access the data and unable to install malicious software on the client device 202. Thus, if an attacker steals the hardware (for example, motherboard), they still have full access to the data stored on the computer as the TPM is part of the motherboard. They can then defeat the approved software security also, without a time constraint. Storage of the second fragment of the key at the remote storage defeats this purpose of the attacker.

In one embodiment, the processing unit 310 prevents booting of the plurality of instructions if the verification of the credentials transmitted by the processing unit 310 to the remote storage 210 fails and/or if the verification of the secured network 214 fails.

In another embodiment, the processing unit 310 prevents accessing of the data by a user of the client device 202 if the verification of the credentials fails and/or the verification of the network fails.

In another embodiment, the processing unit 310 is configured to prevent the booting of the plurality of the instructions if the disk (for example, motherboard, TPM, Hard disk, etc.) is unmounted from the client device 202. In other words, if an attacker steals any of the hardware components from the client device, the booting of the instructions fails. This enhances the security of the client device.

In yet another embodiment, the processing unit 310 is prevents booting of the plurality of the instructions if a connection of the client device with the network fails. In other words, if the verification of the network by the remote storage 210 fails, the client device cannot receive the second fragment of the key from the remote storage 210 and hence, the complete booting of the instructions fails.

Figure 3B:
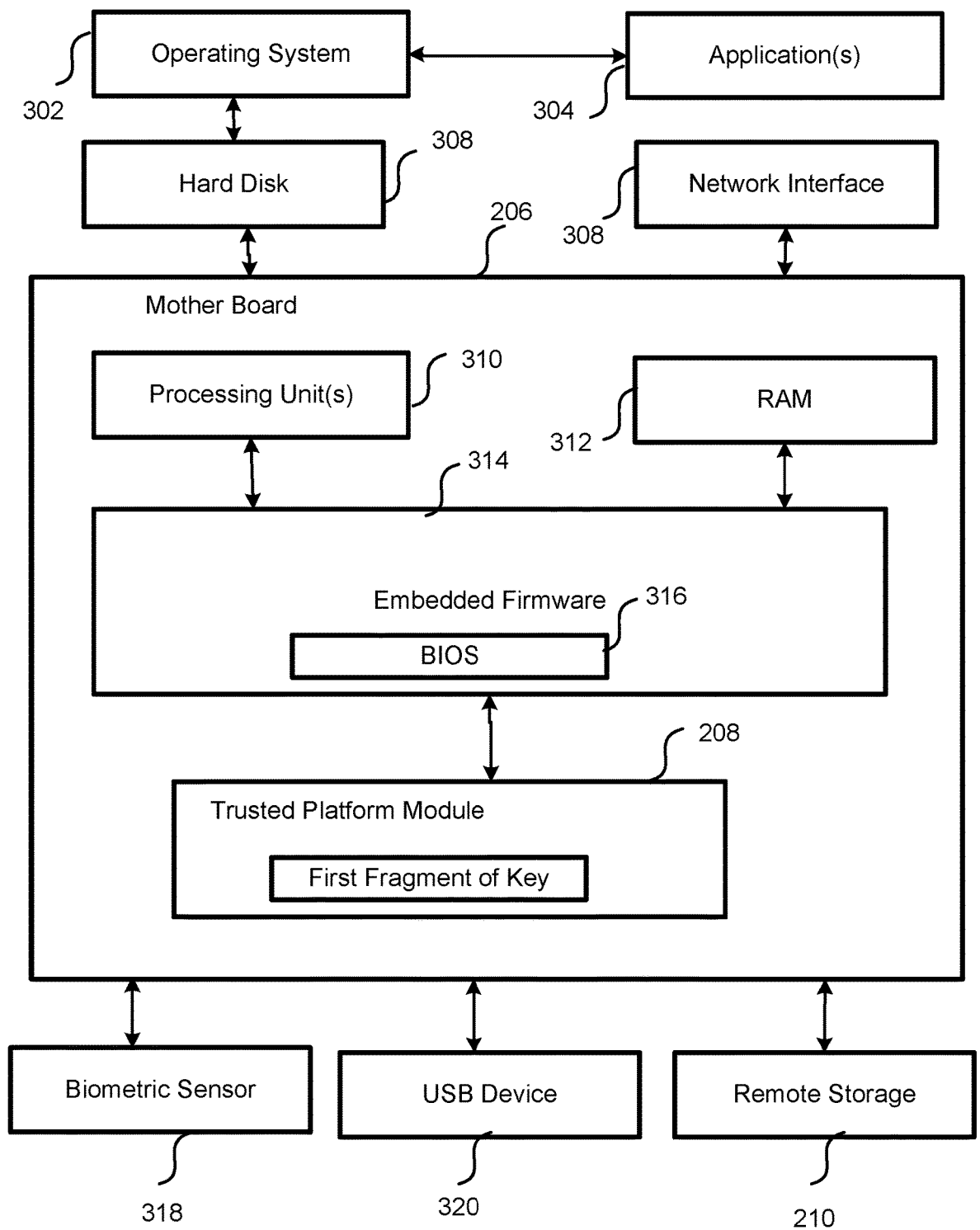
FIG. 3B illustrates a client device, in accordance with another embodiment of the present disclosure.

Referring to FIG. 3B now, another embodiment of the client device 202 is shown, according to some embodiment of the present disclosure. The disclosure of the similar components of the client device 202 as disclosed in FIG. 2A has been omitted here for the sake of ease. The client device 202 is shown connected with a biometric sensor 318, a Universal Serial Bus (USB) device 320 and the remote storage 210. The connection and communication of the client device 202 with the remote storage 210 had already been explained above.

The biometric sensor 318 and the USB device 320 can be used to access the first fragment of the key from the TPM 208. For example, the TPM 208 can include an extra layer of security for accessing the first fragment of the key.

Figure 4:
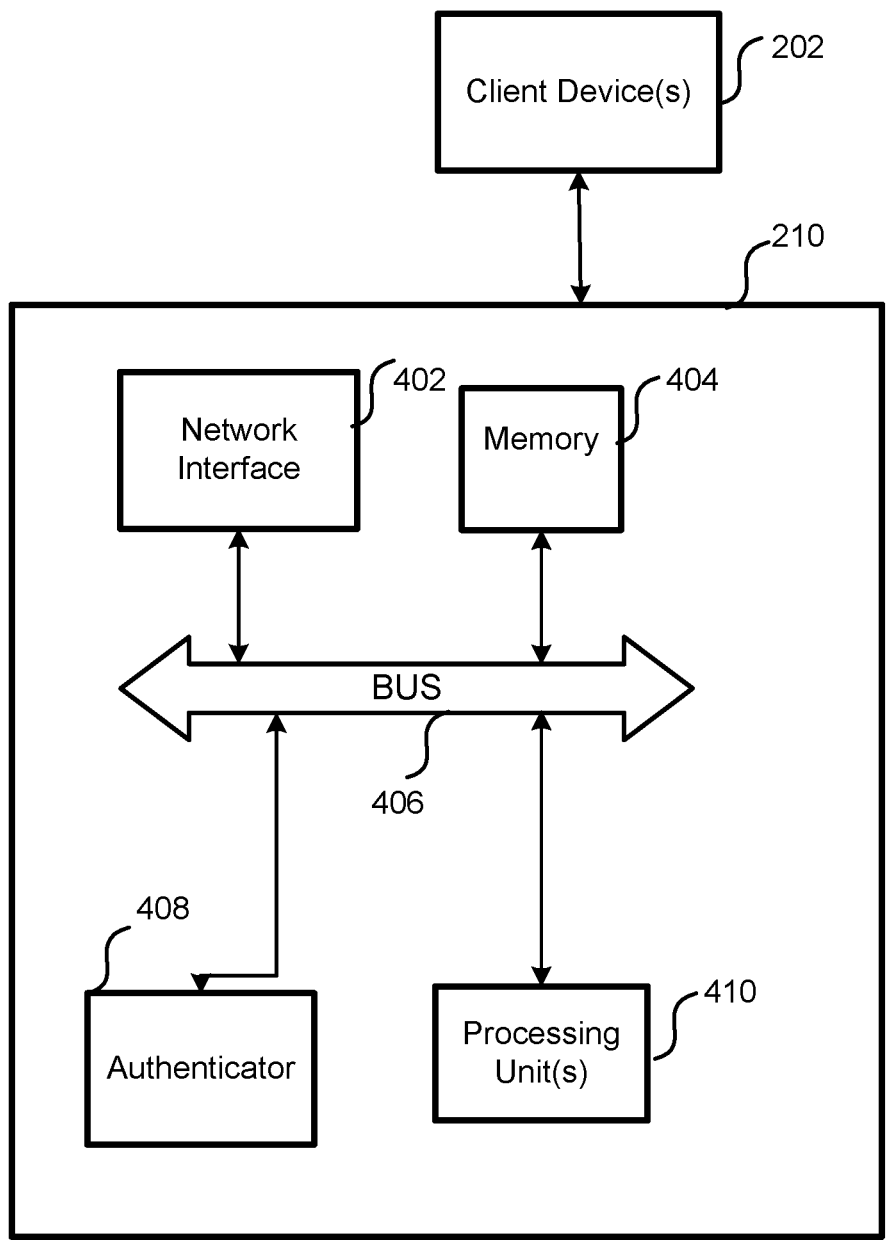
FIG. 4 illustrates a remote storage, in accordance with one embodiment of the present disclosure.

Referring to FIG. 4 now, a block diagram of the remote storage 210 is shown. The remote storage 210 is in communication with the client device 202. The remote storage 210 includes a network interface 402, a storage section 404, a bus 406 for connecting different components, an authenticator 408, and a processing unit 410. In one embodiment, the remote storage 210 is a secure vault that can be accessed using the credentials received from the client device 202.

The network interface 402 can be responsible for establishing a communication with the client device 202. The communication can be either a wired communication or a wireless communication. The storage section 404 can store the second fragment of the key. In one embodiment, there can be separate storage present in the remote storage 210 where the second fragment of the key can be present. The authenticator 408 can be responsible for authenticating the credentials received from the processing unit 310. For example, the authenticator 408 can store pre-defined credentials (username and password). Upon receiving the credentials from the processing unit 310, the authenticator 408 can compare the credentials with the pre-defined credentials. Once the comparison is successful, the processing unit 410 permits the storage section 404 to share the second fragment of the key with the processing unit 310 of the client device 202.

The authenticator 408 also checks if the request for the second fragment of the key is received from the secured network. As mentioned above, the secured network is a network that is already used before or registered by a user to access the remote storage 210.

Figure 5A:
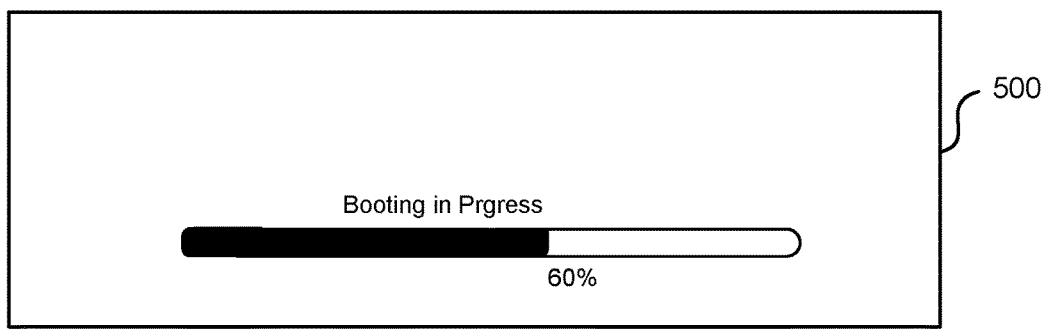
FIGS. 5A-5D illustrates an exemplary embodiment of display during and after booting, in accordance with one embodiment of the present disclosure.

Referring to FIGS. 5A-5D now, a display of the client device 202 during and after booting is completed is shown, according to some embodiment of the present disclosure. For example, FIG. 5A illustrates a display 500 during the booting of the client device 202. For example, the display 500 after the encryption key has been generated by the processing unit 310 by combining the first fragment of the key and the second fragment of the key. The display 500 shows that the booting is 60% complete.

Figure 5B:
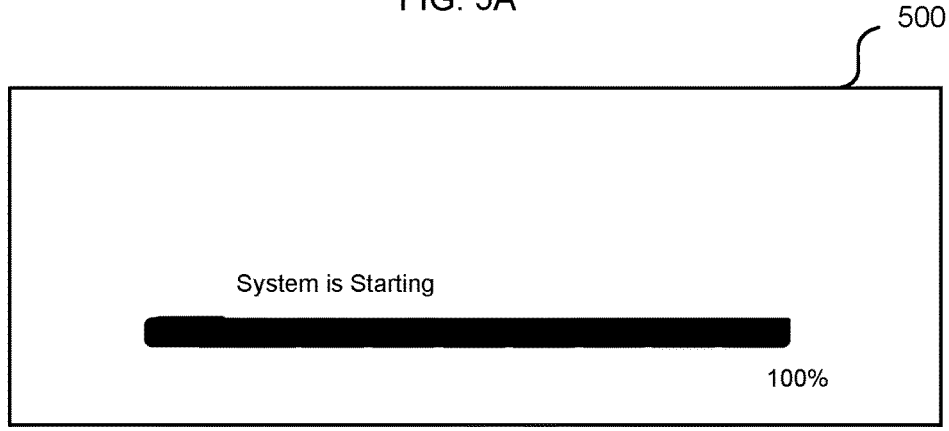
Figure 5C:
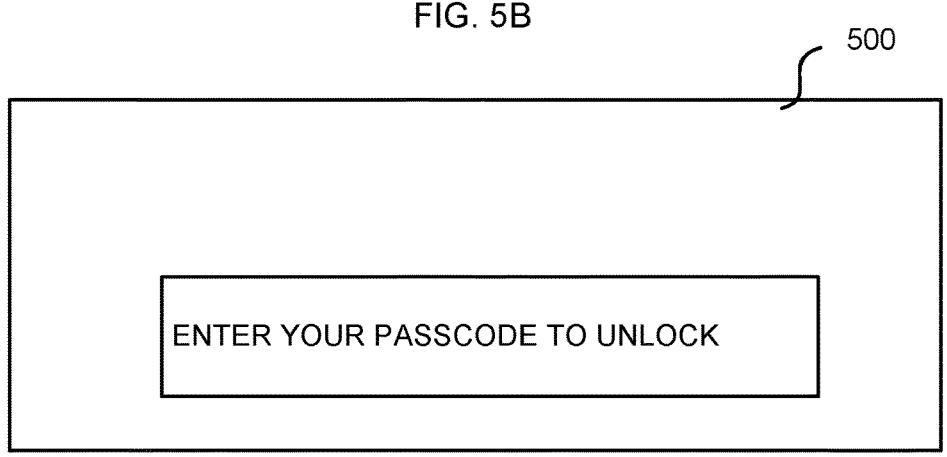
Figure 5D:

FIG. 5B illustrates the display 500 where the booting is 100% complete and the client device 202 is ready to start and provide full access to the data to a user. Before providing complete access to the client device 202 to the user, the client device 202 can ask for a passcode from the user to unlock the client device. The display 500 of the client device 202 where a message for entering the passcode is displayed is shown in FIG. 5C. The passcode can be set by the user so that the user can use the client device 202. Once the user enters the passcode, the display 500 as shown in FIG. 5D with a screensaver is shown on the display 500. The display 500 can also include various icons which can be clicked by the user indicating that the client device 202 is now available for access by the user.

Figure 6:
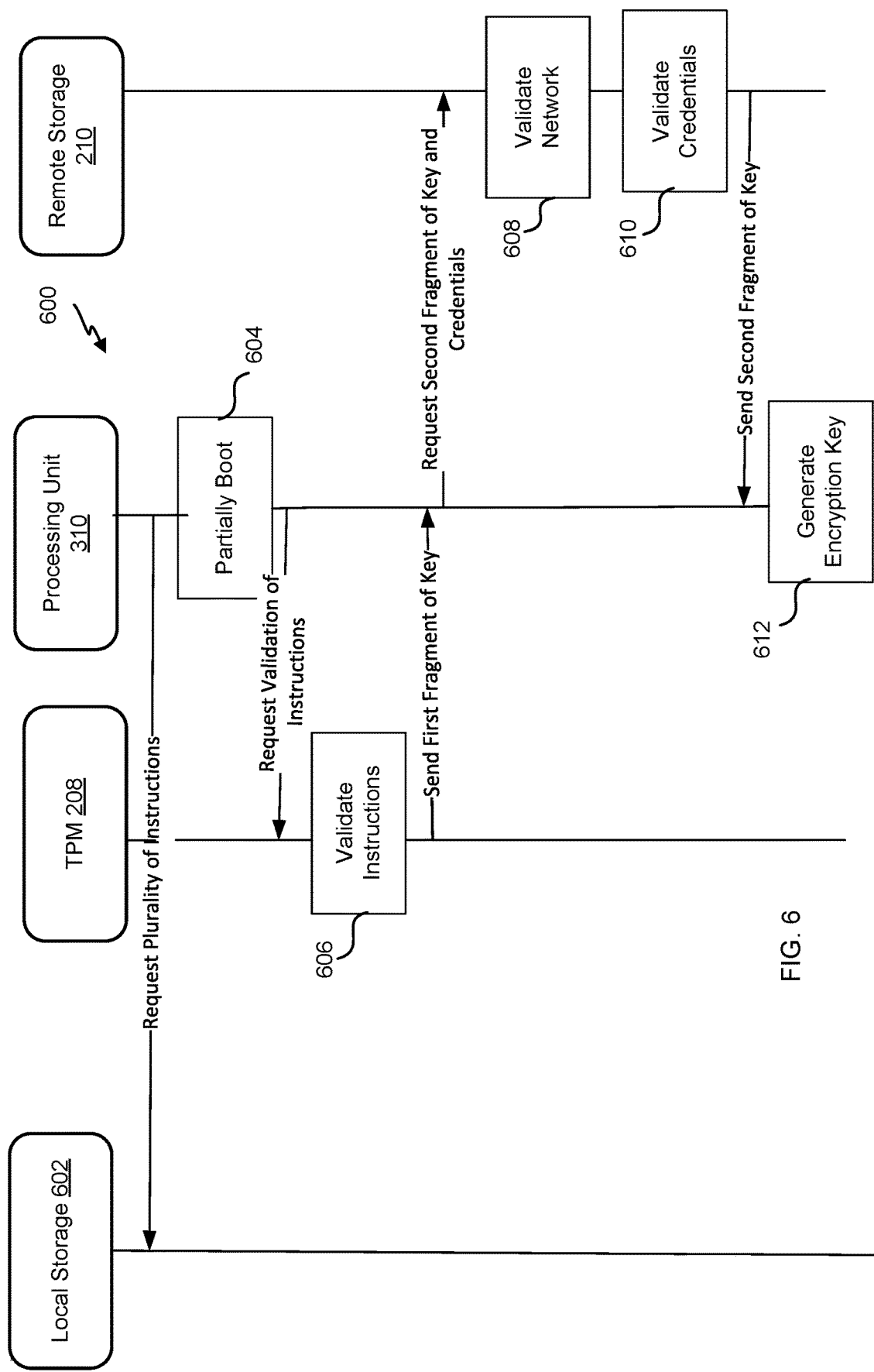
FIG. 6 illustrates a swim diagram describing communication between various entities, in accordance with one embodiment of the present disclosure.

Referring to FIG. 6 now, a swim diagram 600 showing an interaction between various hardware components, in accordance with an embodiment of the present disclosure. In particular, the interaction has been shown between a local storage 602, the TPM 208, the processing unit 310, and the remote storage 210. The local storage 602 can be the hard disk or RAM.

The processing unit 310 sends a request to the local storage 602 to access a plurality of instructions stored in the local storage 602.

At block 604, upon receiving the plurality of instructions from the local storage 602, the processing unit 310 partially boots the plurality of instructions. The processing unit 310 then sends a request to the TPM 208 for validating the plurality of instructions received from the local storage 602.

At block 606, the TPM 208 validates the instructions received from the processing unit 310. Upon validation of the instructions by the TPM 208, the TPM 208 sends the first fragment of the encryption key to the processing unit 310.

At block 608, the processing unit 310 then sends a request for receiving the second fragment of the key to the remote storage 210 along with credentials to access the remote storage 210.

At blocks 610 and 612, the remote storage 210 checks if a network through which the request for the second fragment of key and credentials is received from the processing unit 310 is a secured network and the credentials are valid, respectively. If the network is a secured network that is it satisfies at least one predetermined criteria and the credentials are valid, the remote storage 210 transmits the second fragment of the key to the processing unit 310. The processing unit 310 then combines the first fragment of the key and the second fragment of the key to generate an encryption key, at block 612. The encryption key thus generate helps complete the booting of the client device 202. With complete booting, and the user is provided with access to the user data provided in the client device 202.

Figure 7A:
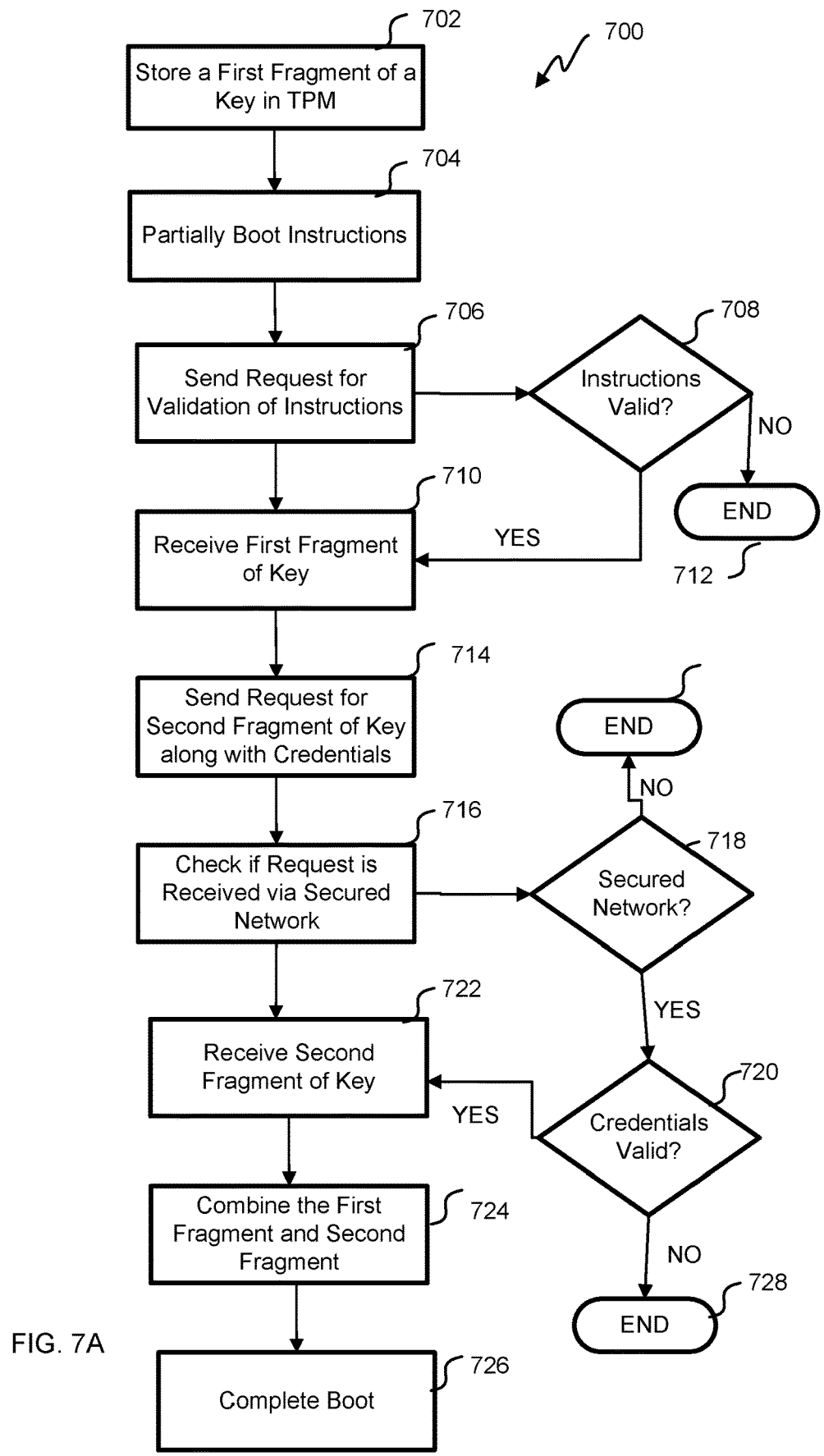
FIG. 7A-7C illustrates a flow diagram describing a method for providing encryption of a disk in a computer, in accordance with one embodiment of the present disclosure.

Referring to FIG. 7A now, a flowchart describing a method 700 for providing encryption of a disk in a computer, in accordance with an embodiment of the present disclosure. Generally, the disk encryption keys are stored in a local chip called Trusted Platform Module (TPM) present on the client device 202 (202A and 202B). However, storing the encryption keys in the local chip is not secure because if an attacker steals the hardware (for example, motherboard or TPM), the attacker can get full access to the data present on the client device 202 (202A and 202B). Further, the attacker can get full access to download and install any malicious software on the client device. The present disclosure solves this problem by splitting the disk encryption key between multiple secure sources, thereby providing enhanced security. For example, one half (or first fragment) of the key is stored in the TPM while the other half (or second fragment) is stored in the remote storage. The remote storage can be different than the storage present inside the TPM. In one embodiment, the remote storage can form part of an application running on the client device 202 or can be accessed using the secured network 214.

Method 700 begins at block 702 where a first fragment of a key is stored in the TPM 208. The first fragment of the key can be pre-stored and can be stored by a user or manufacturer of the TPM 208.

At block 704, the processing unit partially boots a plurality of instructions stored in the memory (either a non-volatile memory or the volatile memory). The plurality of instructions includes instructions relating to the booting of the computer system including booting files and directories.

At block 706, the processing unit 310 sends a request for validating the plurality of instructions to the TPM 208.

At block, 708, checking if the plurality of instructions is validated by the TPM 208. If the plurality of instructions is validated, the processing unit 310, at block 710, receives the first fragment of the key from the TPM 208. If however, the plurality of instructions are not considered to be valid by the TPM 208, the method 700 ends (at block 712).

Once the first fragment of the key is received, the processing unit 310, at block 714, sends a request for a second fragment of the key to the remote storage 210 along with credentials. The credentials are used to access the remote storage 210. The credentials generally include a username and a password.

At block 716, the remote storage 210 checks if the request from the client device 202 is received over the secured network 214. In particular, the remote storage 210 verifies the secured network 214, where verification of the secured network includes checking if the secured network 214 meets at least one predefined criteria. The predefined criteria include, for example, criteria that the secured network 214 has been used before for accessing the remote storage or if the secured network 214 is pre-registered by a user for accessing the remote storage 210. If the request is received via the secured network 214 (i.e., YES at block 718), method 700 proceeds to block 720.

At block 720, the remote storage 210 checks if the credentials received from the processing unit 310 are valid. The validation of the credentials can be checked by comparing the credentials received from the processing unit 310 with a list of credentials already stored in the remote storage 210. If the credentials are considered to be valid (YES at block 720), method 700 proceeds at block 722. Thus, at block 722, the processing unit 310 receives the second fragment of the key.

Then, block 724, the processing unit 310 combines the first fragment of the key and the second fragment of the key to generate an encryption key. The encrypted key provides for complete booting of the client device 202 (at block 726) along with providing complete access to the data present in the client device 202. If, however, the credentials are not considered to be valid (or do not match with the already stored credentials present in the remote storage), the booting process ends (at block 728).

Figure 7B:
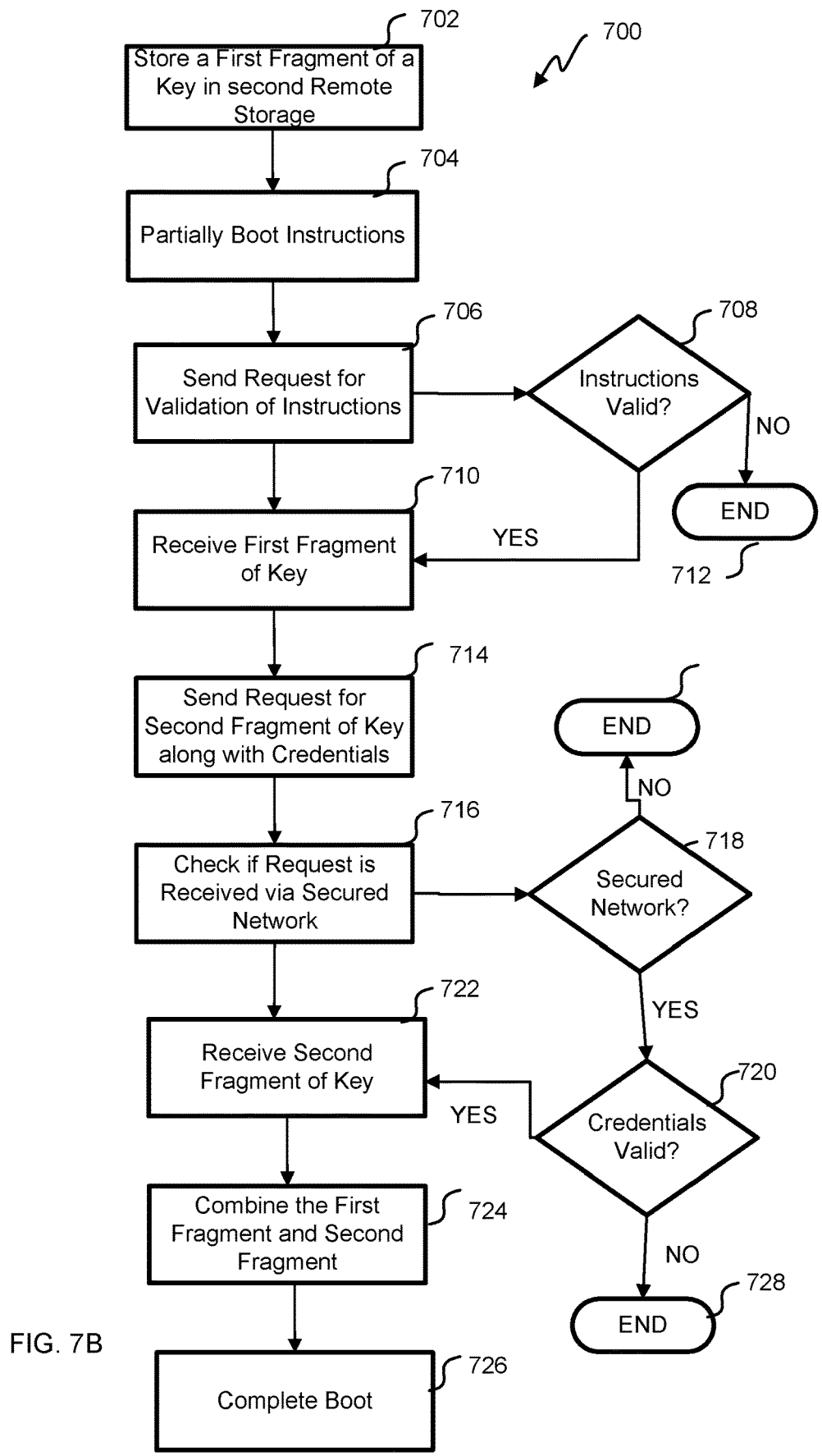
Figure 7C:
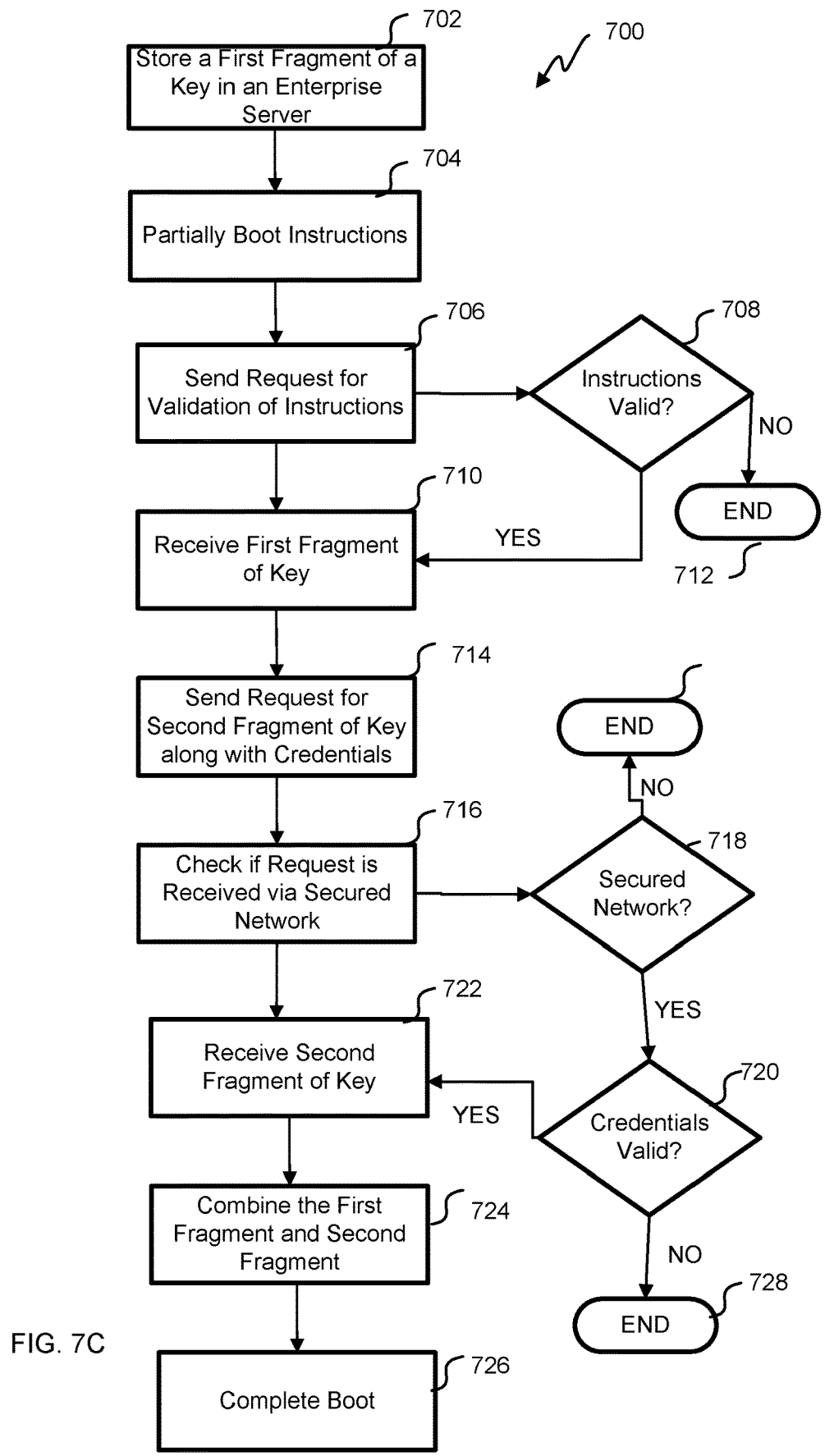

In one embodiment, the first fragment of the key can be received from a second remote storage (not shown) or an enterprise server (not shown). FIGS. 7B and 7C illustrates these embodiments. All the steps in FIGS. 7B and 7C are similar to that of 7A except steps 702 where the first fragment of the key is extracted from the second remote storage in FIG. 7B while the first fragment of the key is extracted from the enterprise server in FIG. 7C.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A system for providing encryption of a disk in a client device, the system comprising:
  a trusted platform module (TPM) comprising a first fragment of a key;
  a remote storage connected with the TPM, wherein the remote storage comprises a second fragment of the key; and
  the client device configured to:
    partially boot a plurality of instructions in the client device from the disk;
    send a request for validation of the plurality of instructions to the TPM;
    receive the first fragment of the key from the TPM in response to the validation of the plurality of instructions; and
    send a request for the second fragment of the key to the remote storage along with credentials, wherein:
      the credentials are used to access the remote storage;
      a network is verified; and verification of the network includes checking Internet Protocol (IP) address;
receive the second fragment of the key if the credentials are verified by the remote storage and the network meets at least one predefined criteria;
combine the first fragment of the key and the second fragment of the key to generate an encryption key;
complete the booting of the plurality of instructions from the disk decrypting data on the disk using the encryption key, and
access data stored on the client device in response to the completion of the booting of the plurality of instructions from the disk.

2. The system for providing encryption of a disk in the client device, as recited in claim 1, wherein the client device is configured to prevent booting of the plurality of instructions if the verification of the credentials fails and/or the verification of the network fails.

3. The system for providing encryption of a disk in the client device, as recited in claim 1, wherein the client device is configured to prevent accessing of the data if the verification of the credentials fails and/or the verification of the network fails.

4. The system for providing encryption of a disk in the client device, as recited in claim 1, wherein the client device is configured to prevent booting of the plurality of the instructions if the disk is unmounted from the client device.

5. The system for providing encryption of a disk in the client device, as recited in claim 1, wherein the client device is configured to prevent booting of the plurality of the instructions if a connection of the client device with the network fails.

6. The system for providing encryption of a disk in the client device, as recited in claim 1, wherein the remote storage comprises a secure vault.

7. A method for providing encryption of a disk in a client device, the method comprising:
partially booting a plurality of instructions from a non-volatile memory;
sending a request for validation of the plurality of instructions to a Trusted Platform Module (TPM);
receiving a first fragment of a key from the TPM in response to the validation of the plurality of instructions;
sending a request for a second fragment of the key to a remote storage along with credentials, wherein:
the credentials are used to access the remote storage;
the remote storage is configured to verify a network; and
verification of the network includes checking Internet Protocol (IP) address;
receiving the second fragment of the key if the credentials are verified by the remote storage and the network meets at least one predefined criteria;
combining the first fragment of the key and the second fragment of the key to generate an encryption key;
completing the booting of the plurality of instructions from the disk by decrypting data on the disk using the encryption key; and
accessing data stored on the client device in response to the completion of the booting of the plurality of instructions from the disk.

8. The method for providing encryption of a disk in the client device, as recited in claim 7, further comprising preventing booting of the plurality of instructions if the verification of the credentials fails and/or the verification of the network fails.

9. The method for providing encryption of a disk in the client device, as recited in claim 7, further comprising preventing accessing of the data if the verification of the credentials fails and/or the verification of the network fails.

10. The method for providing encryption of a disk in the client device, as recited in claim 7, further comprising preventing booting of the plurality of the instructions if the disk is unmounted from the client device.

11. The method for providing encryption of a disk in the client device, as recited in claim 7, further comprising preventing booting of the plurality of the instructions if a connection of the client device with the network fails.

12. The method for providing encryption of a disk in the client device, as recited in claim 7, wherein the remote storage comprises a secure vault.

13. A computer-program product tangibly embodied in a non-transitory machine-readable storage medium, including instructions configured to cause a client device to perform operations including:
partially booting a plurality of instructions from a non-volatile memory;
sending a request for validation of the plurality of instructions to a Trusted Platform Module (TPM);
receiving a first fragment of a key from the TPM in response to the validation of the plurality of instructions;
sending a request for a second fragment of the key to a remote storage along with credentials, wherein:
the credentials are used to access the remote storage;
the remote storage is configured to verify a network; and
verification of the network includes checking Internet Protocol (IP) address;
receiving the second fragment of the key if the credentials are verified by the remote storage and the network meets at least one predefined criteria;
combining the first fragment of the key and the second fragment of the key to generate an encryption key;
completing the booting of the plurality of instructions from a disk by decrypting data on the disk using the encryption key; and
accessing data stored on the client device in response to the completion of the booting of the plurality of instructions from the disk.

14. The computer-program product for providing encryption of a disk in the client device, as recited in claim 13, further comprising preventing booting of the plurality of instructions if the verification of the credentials fails and/or the verification of the network fails.

15. The computer-program product for providing encryption of a disk in the client device, as recited in claim 13, further comprising preventing accessing of the data if the verification of the credentials fails and/or the verification of the network fails.

16. The computer-program product for providing encryption of a disk in the client device, as recited in claim 13, further comprising preventing booting of the plurality of the instructions if the disk is unmounted from the client device.

17. The computer-program product for providing encryption of a disk in the client device, as recited in claim 13, further comprising preventing booting of the plurality of the instructions if a connection of the client device with the network fails.

* * * * *